United States Patent
Deglin et al.

(10) Patent No.: US 11,231,934 B2
(45) Date of Patent: Jan. 25, 2022

(54) SYSTEM AND METHOD FOR CONTROLLING THE ORDER OF INSTRUCTION EXECUTION BY A TARGET DEVICE

(71) Applicant: Samsung Electronics Co., Ltd., Suwon-si (KR)

(72) Inventors: Richard N. Deglin, Monterey, CA (US); Yash Jajoo, Jodhpur (IN); Vulligadla Amaresh, Bangalore (IN); Jihyun Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/882,018

(22) Filed: May 22, 2020

(65) Prior Publication Data

US 2021/0279064 A1 Sep. 9, 2021

Related U.S. Application Data

(60) Provisional application No. 62/985,813, filed on Mar. 5, 2020.

(51) Int. Cl.
| | |
|---|---|
| *G06F 9/38* | (2018.01) |
| *G06F 9/30* | (2018.01) |
| *G06F 13/40* | (2006.01) |
| *G06F 13/42* | (2006.01) |
| *G06F 9/54* | (2006.01) |

(52) U.S. Cl.
CPC ........ *G06F 9/3836* (2013.01); *G06F 9/30145* (2013.01); *G06F 9/546* (2013.01); *G06F 13/4031* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 6,047,334 A | 4/2000 | Langendorf et al. | |
| 6,738,831 B2 | 5/2004 | Wolrich et al. | |
| 9,734,086 B2 | 8/2017 | Flynn et al. | |
| 2004/0181571 A1* | 9/2004 | Atkinson | G06Q 10/107 709/200 |
| 2006/0265534 A1* | 11/2006 | Haga | G06F 13/28 710/243 |
| 2007/0147437 A1* | 6/2007 | Yasui | H04L 1/1854 370/519 |
| 2008/0189501 A1 | 8/2008 | Irish et al. | |
| 2015/0261633 A1* | 9/2015 | Usgaonkar | G06F 11/2097 714/6.3 |
| 2017/0003905 A1* | 1/2017 | Mukherjee | G06F 3/0619 |

(Continued)

*Primary Examiner* — Hyun Nam
(74) *Attorney, Agent, or Firm* — Lewis Roca Rothgerber Christie LLP

(57) ABSTRACT

A system and method for executing instructions in a constrained order. In some embodiments, the method includes: sending by a host, a first instruction, followed by an order-constrained instruction, followed by a second instruction; receiving, by a target, the first instructions, the order-constrained instruction, and the second instruction; and executing, by the target, the first instruction; the order-constrained instruction, after executing the first instruction; and the second instruction, after executing the order-constrained instruction.

20 Claims, 5 Drawing Sheets

(56) References Cited

U.S. PATENT DOCUMENTS

| | | | |
|---|---|---|---|
| 2018/0329820 A1* | 11/2018 | Sinha | G06F 15/17 |
| 2019/0018599 A1* | 1/2019 | Katayama | G06F 12/0875 |
| 2020/0371970 A1* | 11/2020 | Chachad | G06F 13/1605 |
| 2020/0387322 A1* | 12/2020 | Horie | G06F 3/0652 |

* cited by examiner

SYSTEM AND METHOD FOR CONTROLLING THE ORDER OF INSTRUCTION EXECUTION BY A TARGET DEVICE

CROSS-REFERENCE TO RELATED APPLICATION(S)

The present application claims priority to and the benefit of U.S. Provisional Application No. 62/985,813, filed Mar. 5, 2020, entitled "FRAME ORDERING", the entire content of which is incorporated herein by reference.

FIELD

One or more aspects of embodiments according to the present disclosure relate to communications between a host and a target, and more particularly to a system and method for controlling the order of instruction execution by a target.

BACKGROUND

In certain systems in which a host sends instructions to a target, it may be advantageous to cause certain instructions to be executed by the target in an order that complies with execution order constraints specified by the host.

In such systems there is a need for a system and method for controlling the order of instruction execution by a target.

SUMMARY

In some embodiments, a host may be connected to a target (e.g., a persistent storage device) through a transport interconnect (e.g., an expander) which provides multiple paths from the host to the target. An expander may be a hub or switch, making it possible to connect a plurality of persistent storage devices (e.g., solid state drives (SSDs)) to a single host interface. The latency of each path may be variable, e.g., as a result of first-in-first-out storage structures (FIFOs) or buffering mechanisms in the transport interconnect. The host may on occasion send an instruction that may be referred to as a "fence", which is required to be executed by the target after all of the earlier-sent instructions sent by the host, and before any subsequently-sent instruction sent by the host. Some communications systems, such as Serial Attached Small Computer System Interface (SCSI) (SAS), may lack a mechanism by which the host may identify to the target which instructions are fences, which instructions should precede each fence and which instructions should follow each fence. As such, it may not be feasible for the target to determine, from a set of instructions received in an order that differs from the order in which they were sent, what constraints on the order of execution should be observed.

In some embodiments, the target may send an acknowledgment upon receipt of any instruction, and the target may make an entry, for each of the instructions, in an instruction ordering FIFO in the same order as the acknowledgements are sent. The target may continue to receive and execute instructions concurrently, with some delay between receipt and execution, and with the instructions being executed in the order in which the corresponding entries are made in the instruction ordering FIFO. In such an embodiment, the host may wait until it has received all of the acknowledgements for instructions preceding the fence, then send the fence, and then wait until it has received the acknowledgement for the fence before sending any instructions that follow the fence. This process may ensure that the order of the entries in the instruction ordering FIFO complies with the execution order constraints with respect to the fence, and, because the target executes the instructions in the same order as the order of the corresponding entries in the instruction ordering FIFO, it may also ensure that the order in which the instructions are executed complies with the execution order constraints with respect to the fence.

According to an embodiment of the present invention, there is provided a method for executing instructions in a constrained order, the method including: sending by a host, a first instruction, followed by an order-constrained instruction, followed by a second instruction; receiving, by a target, the first instructions, the order-constrained instruction, and the second instruction; and executing, by the target, the first instruction; the order-constrained instruction, after executing the first instruction; and the second instruction, after executing the order-constrained instruction.

In some embodiments, the method further includes sending, by the target, to the host, a plurality of corresponding acknowledgments, including: an acknowledgment for the first instruction, an acknowledgment for the order-constrained instruction, and an acknowledgment for the second instruction, wherein the executing, by the target, of the first instruction, the order-constrained instruction, and the second instruction includes executing, by the target, the first instruction, the order-constrained instruction, and the second instruction in the same order as the sending, by the target, of the corresponding acknowledgements, and wherein the sending, by the host, of the first instruction, the order-constrained instruction, and the second instruction includes: sending, by the host, the order-constrained instruction after receiving, by the host, the acknowledgment for the first instruction, and sending, by the host, the second instruction after receiving, by the host, the acknowledgment for the order-constrained instruction.

In some embodiments, the target is a solid state drive.

In some embodiments, the host is connected to the target by a SCSI connection, and each of the instructions is a SCSI command or a SCSI task management function.

In some embodiments, the SCSI connection is a wide serial attached SCSI (SAS) connection.

In some embodiments, the host is connected to the target through a transport interconnect.

In some embodiments, the method further includes sending, by the host, a third instruction, after the sending of the first instruction, and before the sending of the order-constrained instruction.

In some embodiments, the method further includes receiving, by the target, the third instruction, before receiving, by the target, the first instruction.

In some embodiments, the method further includes sending, by the target, to the host, an acknowledgment for the third instruction before sending, by the target, to the host, the acknowledgment for the first instruction.

In some embodiments, the method further includes executing, by the target, the third instruction before executing, by the target, the first instruction.

According to an embodiment of the present invention, there is provided a system including a target, the target including a processing circuit, the processing circuit being configured to: receive a first instruction; send an acknowledgment for the first instruction; execute the first instruction; receive a second instruction; send an acknowledgment for the second instruction; and execute the second instruction, wherein the executing of the first instruction and the executing of the second instruction are performed in the same order as the sending of the acknowledgment for the first instruction and the sending of the acknowledgment for the second instruction. In some embodiments: the target includes an instruction ordering FIFO, and the processing circuit is further configured to: make a first entry in the instruction ordering FIFO, the first entry corresponding to the first instruction, and make a second entry in the instruction ordering FIFO, the second entry corresponding to the second instruction, the first entry and the second entry being in the same order in the instruction ordering FIFO as the sending of the acknowledgment for the first instruction and the sending of the acknowledgment for the second instruction.

In some embodiments, the target is a solid state drive.

In some embodiments, the target has a serial-attached SCSI interface.

In some embodiments, the target further includes: a first port, a second port, and an arbiter circuit, the arbiter circuit being configured to receive entries corresponding to instructions from the first port and from the second port, and to make corresponding entries in the instruction ordering FIFO.

In some embodiments: the target is a persistent storage device with a wide serial attached SCSI interface; the first port is a port of the wide serial attached SCSI interface; and the second port is a port of the wide serial attached SCSI interface.

In some embodiments, the system further includes a host connected to the target, the host including a processing circuit configured to: send the first instruction to the target; receive the acknowledgment for the first instruction; and send an order-constrained instruction to the target, after receiving the acknowledgment for the first instruction.

In some embodiments: the processing circuit of the target is further configured to: receive the order-constrained instruction, and send an acknowledgement for the order-constrained instruction; and the processing circuit of the host is further configured to send the second instruction after receiving the acknowledgement for the order-constrained instruction.

In some embodiments, the host is connected to the target by a SCSI connection, and each of the instructions is a SCSI command or a SCSI task management function.

According to an embodiment of the present invention, there is provided a system including a target, the target including means for processing, the means for processing being configured to: receive a first instruction; send an acknowledgment for the first instruction; execute the first instruction; receive a second instruction; send an acknowledgment for the second instruction; and execute the second instruction, wherein the executing of the first instruction and the executing of the second instruction are performed in the same order as the sending of the acknowledgment for the first instruction and the sending of the acknowledgment for the second instruction.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
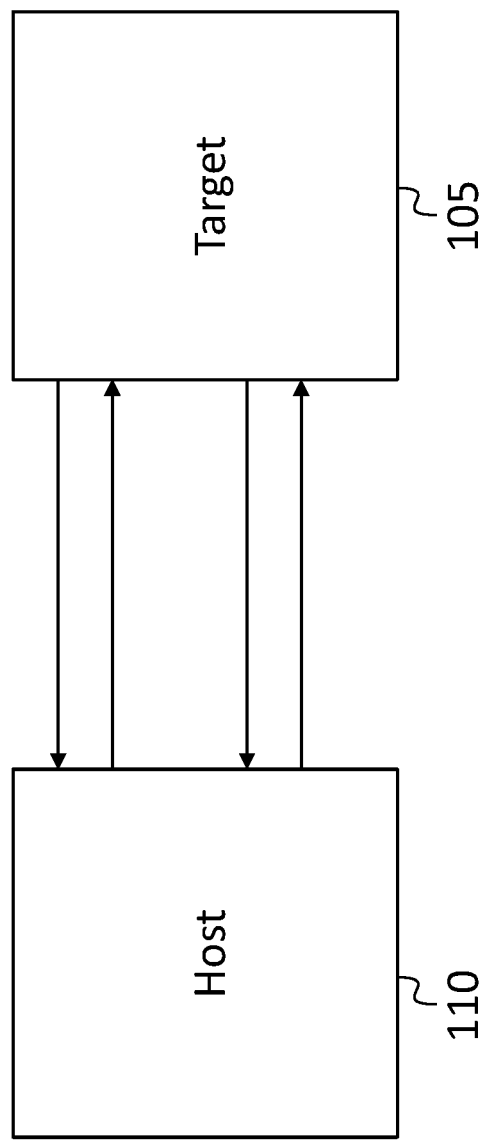
FIG. 1A is a block diagram of a target (e.g., a target device, such as a persistent storage device) connected to a host, according to an embodiment of the present disclosure.

The detailed description set forth below in connection with the appended drawings is intended as a description of exemplary embodiments of a system and method for controlling the order of instruction execution by a target provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In the small computer system interface (SCSI) (SAS) protocol, the host may send, to a target, commands and task management functions (collectively referred to herein as "instructions"). Further, the host may, on occasion, send to a target, an instruction known as a "task management function". Each task management function may serve as a fence, or "order-constrained instruction". The terms "fence" and "order-constrained instruction" are used interchangeably herein. Execution order constraints may apply to the execution of the order-constrained instruction (i.e., to the task management function). Such execution order constraints may require that all instructions sent before the order-constrained instruction must be executed before the order-constrained instruction is executed. The execution order constraints may further require that the order-constrained instruction be executed before any instructions sent after the order-constrained instruction are executed.

In some embodiments, the host and the target can handle the sending and execution of instructions in a manner that ensures that the execution order constraints are complied with, without the target being informed of (i) which instruction is the fence, (ii) which instructions were transmitted before the fence, and (iii) which instructions were transmitted after the fence. This may be accomplished as follows. The target may send an acknowledgment upon receipt of any instruction, and before execution of the instruction commences, the target may make an entry, for each of the instructions, in an instruction ordering first-in first-out structure (FIFO), the entries being made in the same order as the acknowledgements are sent. The target may continue to receive and execute instructions concurrently, with some delay between receipt and execution, and with the instructions being executed in the order in which the corresponding entries are made in the instruction ordering FIFO. In such an embodiment, the host may wait until it has received all of the acknowledgements for instructions preceding the fence, then send the fence, and then wait until it has received the acknowledgement for the fence before sending any instructions that follow the fence. This process may ensure that the order of the entries in the instruction ordering FIFO complies with the execution order constraints with respect to the fence, and, because the target executes the instructions in the same order as the order of the corresponding entries in the instruction ordering FIFO, it may also ensure that the order in which the instructions are executed complies with the execution order constraints with respect to the fence. Although some embodiments of the present disclosure describe a system and method for controlling the order of instruction execution by a target in the context of a host and a target connected by a SAS link, or connected by a SAS link through a SAS expander, the invention is not limited to such embodiments and may generally be relevant to any situation in which the order of instruction execution by a target is to be controlled. For example, some embodiments may work with any other suitable standard or be standalone.

Referring to FIG. 1A, in some embodiments, a target 105 is connected to a host 110 by a 2-wide SAS connection. In such an embodiment, the target 105 and the host 110 are connected by two data links, each of which may be used by the host 110 to send instructions to the target. The latencies of the links may vary, for example because each port interface in the host 110 may include a FIFO for buffering instructions, and because the fullness of these FIFOs may vary as instructions are added by the host 110 and removed as they are sent out. As such, the order in which the instructions are received by the target 105 may differ from the order in which they are enqueued by the host for sending to the target.

Figure 1B:
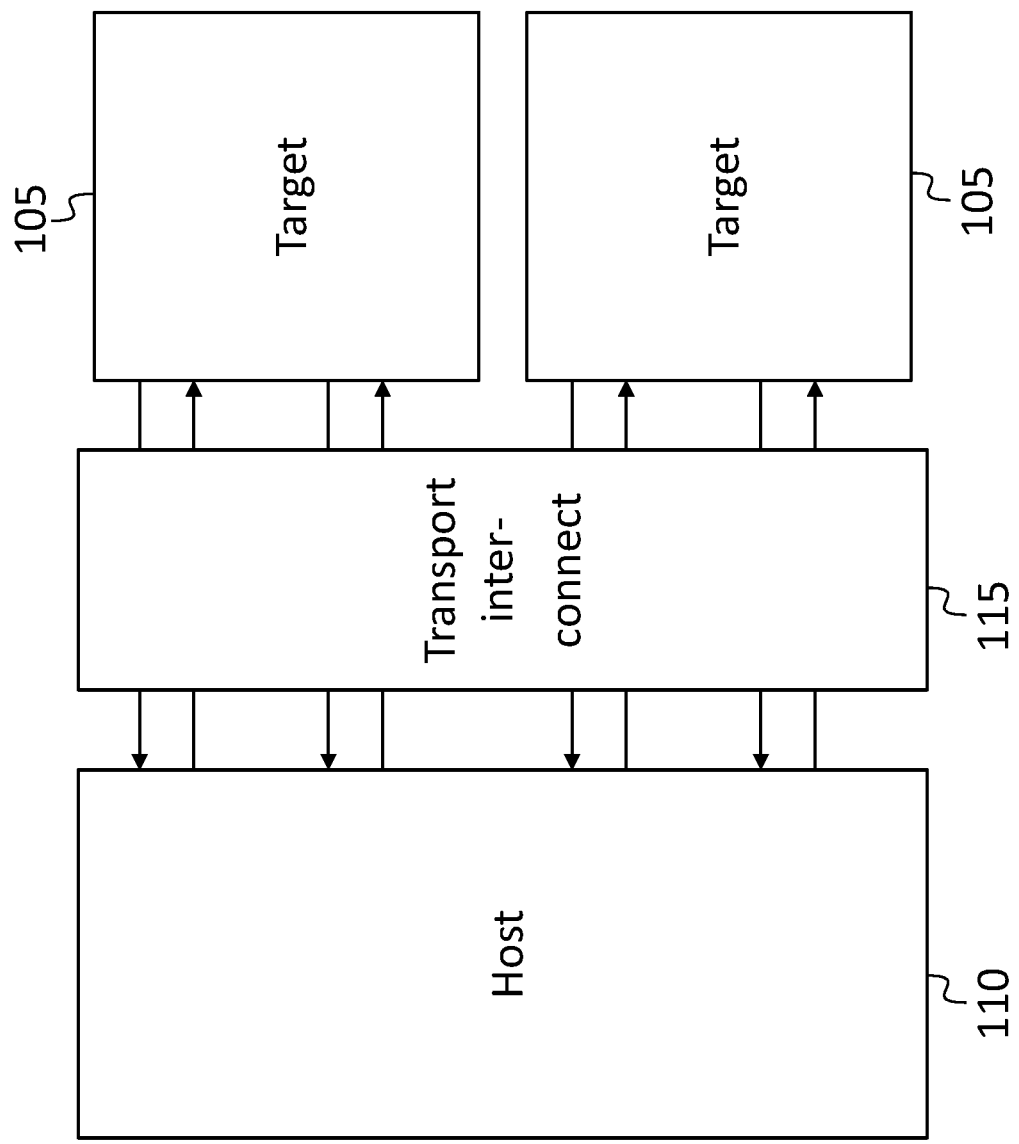
FIG. 1B is a block diagram of a target connected to a host through a transport interconnect, according to an embodiment of the present disclosure.

Similarly, in the embodiment of FIG. 1B, in which two targets 105 are connected to a host 110 through a transport interconnect (e.g., a SAS expander) 115 by wide SAS connections, further variability may be present in the delay between the enqueueing of an instruction by the host and the receipt of the instruction by the target to which it is sent, because, for example, the transport interconnect 115 may also include FIFOs, and the fullness of any such FIFO may vary, causing variations in the delay experienced by any instruction in traversing the FIFO.

Figure 2:
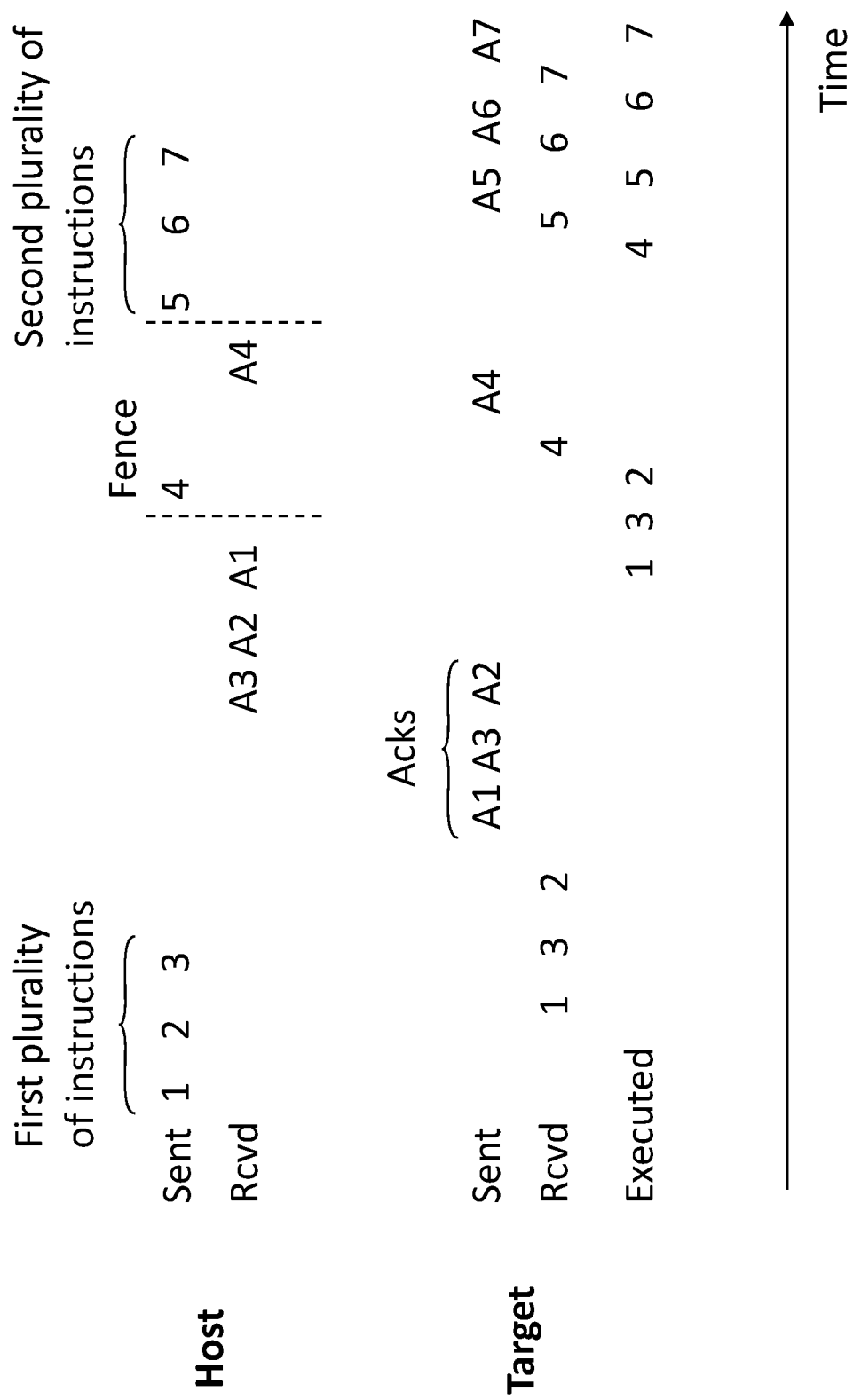
FIG. 2 is time sequence diagram of instructions and acknowledgments sent between a host and a target, according to an embodiment of the present disclosure.

In part for these reasons, instructions sent by the host may be received out of order, i.e., in an order different than the order in which they were sent. FIG. 2 shows a timeline of events for the sending of seven instructions, including an order-constrained instruction (or "fence") which is instruction 4 in this example. In the example of FIG. 2, the host sends a first plurality of instructions including three instructions, in order (i.e., in the order 1, 2, 3), and they are received by the target out of order (in the order 1, 3, 2), with the third instruction having overtaken the second instruction in travelling from the host to the target. In FIG. 2, variable latency within the host is assumed, for simplicity, not to cause any re-ordering of the instructions, so that the instructions are sent by the host 110 in the order in which they are enqueued. After receiving each instruction, the target 105 sends an acknowledgment ("Ack") to the host and makes an entry in the instruction ordering FIFO, the acknowledgments being sent in the same order as the entries are made in the instruction ordering FIFO. The target then proceeds to execute the instructions, with execution potentially occurring significantly later than receipt, and with execution occurring in the same order as the adding of the corresponding entries to the instruction ordering FIFO, which in turn is the same as the order of the sending of the acknowledgments.

The host sends the order-constrained instruction, instruction 4, only after having received all of the acknowledgements for the previously sent instructions (instructions 1, 2, and 3, for which, in the example of FIG. 2, the acknowledgments are received in reverse order, i.e., in the order A3, A2, and A1), with acknowledgments A2 and A3 both having overtaken acknowledgment A1 on the way back to the host. Although the host sends the order-constrained instruction, instruction 4, before instruction 2 is executed, it is nonetheless assured that instruction 4 will be executed after instruction 2, because the host's having received the acknowledgement for instruction 2 implies that an entry for instruction 2 is already in the instruction ordering FIFO, so that when instruction 4 is received by the target, its entry in the instruction ordering FIFO will necessarily be behind that of instruction 2, and therefore instruction 4 will be executed later than instruction 2, complying with the execution order constraints. The same reasoning applies to instructions 1 and 3. Because the entry for each of these two instructions is already in the instruction ordering FIFO (as evidenced by the receipt, by the host, of the corresponding acknowledgments, A1 and A3) when the host sends the order-constrained instruction, instruction 4, it is certain that (i) the entry for instruction 4 will be behind the entries for instruction 4 in the instruction ordering FIFO, and therefore that (ii) instruction 4 will be executed after instruction 1 and after instruction 3.

Similarly, the host waits for receipt of the acknowledgement for instruction 4 before sending any of the subsequent instructions 5, 6 and 7. This ensures that the entry for instruction 4 is in the instruction ordering FIFO before any of the subsequent instructions 5, 6 and 7 is sent, and that therefore instruction 4 will be executed before any of the subsequent instructions 5, 6 and 7, even if instruction 4 has not yet been executed when some of the subsequent instructions 5, 6 and 7 are sent by the host (as in the example in FIG. 2, in which instruction 5 is sent before instruction 4 is executed).

In some embodiments, compliance with the execution order constraints may be assured even if the target does not ensure under every circumstance that the acknowledgments are sent in the order in which the corresponding entries are made in the instruction ordering FIFO. For example, if for any two instructions that are received nearly at the same time, at times differing by at most a first time interval t, it is possible that the order of their entries in the instruction ordering FIFO is different from the order in which the corresponding acknowledgements are sent, the above-described system and method may nonetheless be reliable if t is less than T, the minimum round-trip time from the host to the target. This is the case because if, for example, instruction 4 were sent immediately upon receipt of acknowledgment A1, instruction 4 would be received by the target later than instruction 1 by at least a time interval T, which is greater than t, and therefore sufficiently great that the entry for instruction 4 would not be placed ahead of the entry for instruction 1 in the instruction ordering FIFO.

Figure 3:
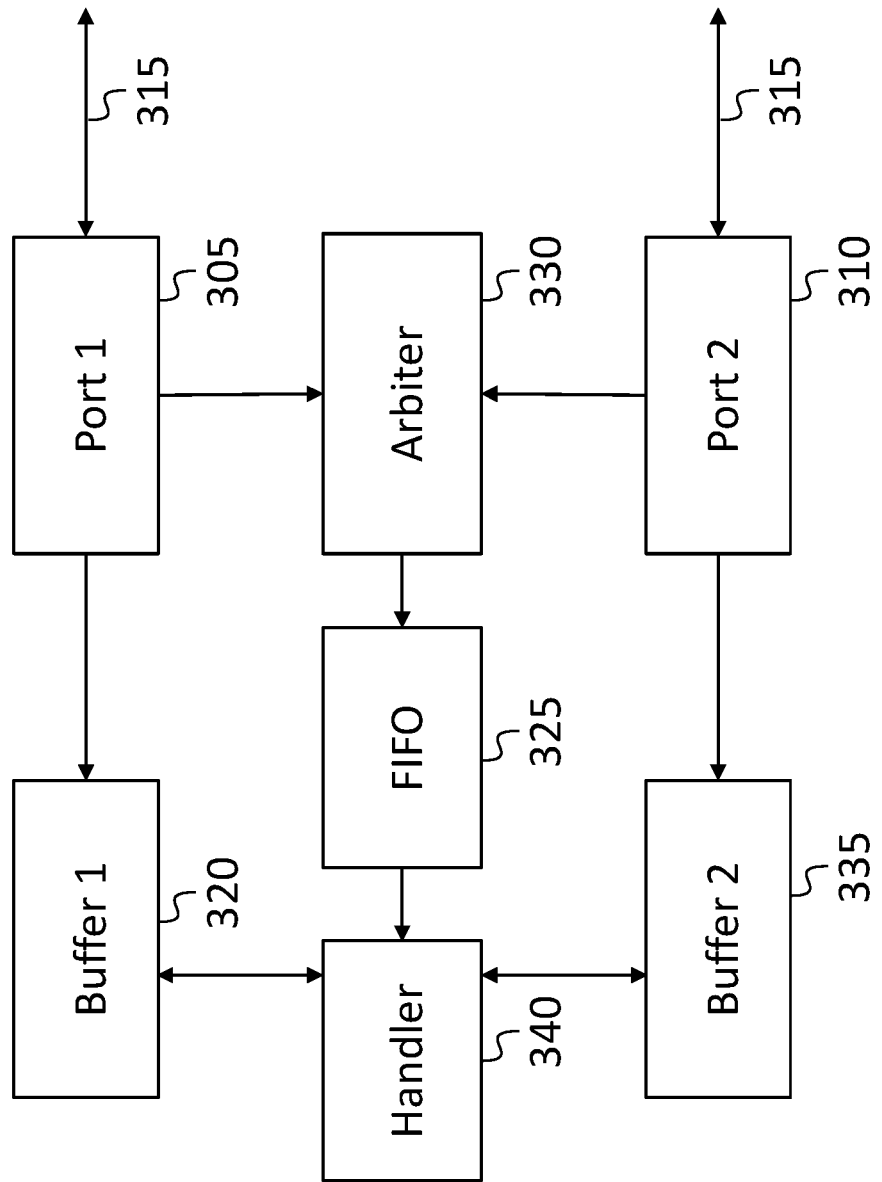
FIG. 3 is a block diagram of a portion of a target, according to an embodiment of the present disclosure.

FIG. 3 is a block diagram of a portion of a target having a wide serial attached SCSI interface, in some embodiments. The target may have a first port 305 that is a port of the wide serial attached SCSI interface and a second port 310 that is also a port of the wide serial attached SCSI interface. In operation, the first port receives instructions through the wide SAS interface 315 from the host; each received instruction is stored in a first buffer 320 (e.g., a circular buffer) as it is received. When a complete instruction has been received, the first port 305 performs a validity check (e.g., a cyclic redundancy check (CRC)). If the first port 305 determines that the received instruction is valid (e.g., not corrupted by bit errors during transmission), it sends an acknowledgment for the instruction back to the host, and it sends, to an arbiter 330, an entry (e.g., a FIFO entry)

corresponding to the instruction. The entry may be, for example, a pointer to the location at which the instruction is stored in the first buffer 320.

The second port 310 may operate in the same manner as the first port 305 (storing instructions in a second buffer 335, and causing the arbiter to make entries in the instruction ordering FIFO that point into the second buffer 335), and the arbiter may determine the order in which entries for the instruction ordering FIFO are to be placed in the instruction ordering FIFO. For example, the arbiter 330 may make entries in the instruction ordering FIFO 325 in the order in which they are received (from either of the first port 305 or the second port 310) and, for simultaneously received entries, it may take an action selected from a list including (but not limited to) the following list of actions. It may (i) place the entry received from the first port 305 in the instruction ordering FIFO first, or (ii) place the entry received from the second port 310 in the instruction ordering FIFO first, or (iii) alternate between preferring the first port 305 and preferring the second port 310, or (iv) select one or the other of the first port 305 and second port 310 based on a pseudo-random number.

An instruction handler 340 may arrange for the execution, one at a time, of the instructions in the first buffer 320 and the second buffer 335, by reading entries from the instruction ordering FIFO 325 one at a time, and, for each entry, executing the corresponding instruction (e.g., executing the instruction to which the entry points). The embodiment of FIG. 3 may not be capable of ensuring in all circumstances that the acknowledgments are sent in the order as the corresponding entries are made in the instruction ordering FIFO; for example if both the first port 305 and the second port 310 determine simultaneously (e.g., during the same clock cycle) that respective received instructions are valid, they may send their acknowledgements simultaneously, whereas the arbiter must place one entry ahead of the other in the instruction ordering FIFO. In some embodiments, to avoid this limitation, each port may wait for consent from the arbiter (consent that is given only after a corresponding entry has been made in the instruction ordering FIFO) before sending an acknowledgment. In such an embodiment, the requirement that T be greater than t may be eliminated.

Figure 4:
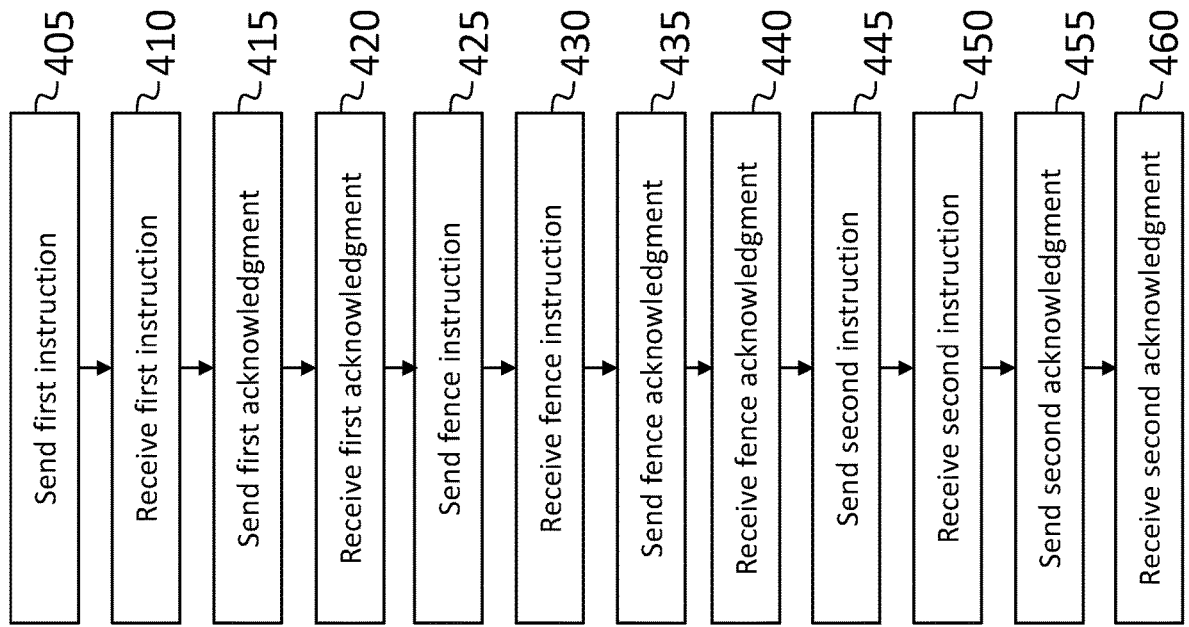
FIG. 4 is a flow chart of a method for sending instructions and acknowledgments between a host and a target, according to an embodiment of the present disclosure.

FIG. 4 is a flow chart for a method for controlling the order of instruction execution by a target 105, in some embodiments. At 405, the host 110 sends a first instruction to the target 105. At 410, the target 105 receives the first instruction, at 415, the target 105 sends an acknowledgment for the first instruction to the host 110, and at 420, the host 110 receives the acknowledgment for the first instruction from the target 105. At 425, the host 110 sends an order-constrained instruction (i.e., a fence instruction) to the target 105. The host 110 may send the order-constrained instruction only after receiving, at 420, the acknowledgment for the first instruction from the target 105. At 430, the target 105 receives the order-constrained instruction, at 435, the target 105 sends an acknowledgment for the order-constrained instruction to the host 110, and at 440, the host 110 receives the acknowledgment for the order-constrained instruction from the target 105. At 445, the host 110 sends a second instruction to the target 105. The host 110 may send the second instruction only after receiving, at 440, the acknowledgment for the order-constrained instruction from the target 105. At 450, the target 105 receives the second instruction, at 455, the target 105 sends an acknowledgment for the second instruction to the host 110, and at 460, the host 110 receives the acknowledgment for the second instruction from the target 105.

Each of the host 110 and the target 105 may include a processing circuit for performing the methods described herein. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

As used herein, "a portion of" something means "at least some of" the thing, and as such may mean less than all of, or all of, the thing. As such, "a portion of" a thing includes the entire thing as a special case, i.e., the entire thing is an example of a portion of the thing. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

As used herein, the term "array" refers to an ordered set of numbers regardless of how stored (e.g., whether stored in consecutive memory locations, or in a linked list). As used herein, the term "rectangle" includes a square as a special case, i.e., a square is an example of a rectangle. As used herein, a first rectangle may be said to "contain" a second rectangle when no part of the second rectangle is outside of the first rectangle. As such, when a first rectangle is identical to a second rectangle, and the first rectangle is in the same position as the second rectangle, the first rectangle contains the second rectangle and the second rectangle contains the first rectangle. As used herein, when a first quantity (e.g., a first array) is referred to as being "based on" a second quantity (e.g., a second array) it means that the second quantity influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

As used herein, the term "or" should be interpreted as "and/or", such that, for example, "A or B" means any one of "A" or "B" or "A and B". As used herein, when a method (e.g., an adjustment) or a first quantity (e.g., a first value) is referred to as being "based on" a second quantity (e.g., a second value) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized", respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for controlling the order of instruction execution by a target have been specifically described and illustrated herein, many modifications and variations will be apparent to those skilled in the art. Accordingly, it is to be understood that a system and method for controlling the order of instruction execution by a target constructed according to principles of this disclosure may be embodied other than as specifically described herein. The invention is also defined in the following claims, and equivalents thereof.

What is claimed is:

1. A method for executing instructions in a constrained order, the method comprising:
    sending by a host, a first instruction, followed by an order-constrained instruction, followed by a second instruction;
    receiving, by a target, the first instruction, the order-constrained instruction, and the second instruction; and
    executing, by the target,
        the first instruction;
        the order-constrained instruction, after executing the first instruction; and
        the second instruction, after executing the order-constrained instruction,
    wherein the executing, by the target, the first instruction, the order-constrained instruction, and the second instruction comprises:
        entering the first instruction in an instruction ordering;
        transmitting an acknowledgment to the host indicating the first instruction is entered or to be entered in the instruction ordering;
        receiving, from the host, the order-constrained instruction in response to the acknowledgment; and
        entering the order-constrained instruction in the instruction ordering in an order after the first instruction, and
    wherein the target is configured to execute the first instruction and the order-constrained instruction in the same order as the instruction ordering.

2. The method of claim 1, further comprising sending, by the target, to the host, a plurality of corresponding acknowledgments, including:
    the acknowledgment for the first instruction,
    an acknowledgment for the order-constrained instruction, and
    an acknowledgment for the second instruction,
    wherein the executing, by the target, of the first instruction, the order-constrained instruction, and the second instruction comprises executing, by the target, the first instruction, the order-constrained instruction, and the second instruction in the same order as the sending, by the target, of the corresponding acknowledgements, and
    wherein the sending, by the host, of the first instruction, the order-constrained instruction, and the second instruction comprises:
        sending, by the host, the order-constrained instruction after receiving, by the host, the acknowledgment for the first instruction, and
        sending, by the host, the second instruction after receiving, by the host, the acknowledgment for the order-constrained instruction.

3. The method of claim 2, wherein the target is a solid state drive.

4. The method of claim 2, wherein the host is connected to the target by a SCSI connection, and each of the instructions is a SCSI command or a SCSI task management function.

5. The method of claim 4, wherein the SCSI connection is a wide serial attached SCSI (SAS) connection.

6. The method of claim 2, wherein the host is connected to the target through a transport interconnect.

7. The method of claim 2, further comprising, sending, by the host, a third instruction, after the sending of the first instruction, and before the sending of the order-constrained instruction.

8. The method of claim 7, further comprising, receiving, by the target, the third instruction, before receiving, by the target, the first instruction.

9. The method of claim 8, further comprising sending, by the target, to the host, an acknowledgment for the third instruction before sending, by the target, to the host, the acknowledgment for the first instruction.

10. The method of claim 9, further comprising executing, by the target, the third instruction before executing, by the target, the first instruction.

11. A system comprising a target,
the target comprising a processing circuit,
the processing circuit being configured to:
  receive a first instruction;
  send an acknowledgment for the first instruction;
  execute the first instruction;
  receive a second instruction;
  send an acknowledgment for the second instruction; and
  execute the second instruction,
wherein
  the executing of the first instruction and
  the executing of the second instruction
are performed in the same order as
  the sending of the acknowledgment for the first instruction and
  the sending of the acknowledgment for the second instruction, and
wherein the executing of the first instruction and the second instruction comprises:
  entering the first instruction and the second instruction in an instruction ordering in an order in which the first instruction and the second instruction are received;
  sending the acknowledgements for the first and second instructions in response to the entering of the first and second instructions in the instruction ordering; and
  executing the first instruction and the second instruction in the same order as the instruction ordering.

12. The system of claim 11, wherein:
the target comprises an instruction ordering FIFO, and
the processing circuit is further configured to:
  make a first entry in the instruction ordering FIFO, the first entry corresponding to the first instruction, and
  make a second entry in the instruction ordering FIFO, the second entry corresponding to the second instruction,
the first entry and the second entry being in the same order in the instruction ordering FIFO as
  the sending of the acknowledgment for the first instruction and
  the sending of the acknowledgment for the second instruction.

13. The system of claim 12, wherein the target is a solid state drive.

14. The system of claim 13, wherein the target has a serial-attached SCSI interface.

15. The system of claim 12, wherein the target further comprises:
a first port,
a second port, and
an arbiter circuit,
the arbiter circuit being configured to receive entries corresponding to instructions from the first port and from the second port, and to make corresponding entries in the instruction ordering FIFO.

16. The system of claim 15, wherein:
the target is a persistent storage device with a wide serial attached SCSI interface;
the first port is a port of the wide serial attached SCSI interface; and
the second port is a port of the wide serial attached SCSI interface.

17. The system of claim 11, further comprising a host connected to the target, the host comprising a processing circuit configured to:
  send the first instruction to the target,
  receive the acknowledgment for the first instruction; and
  send an order-constrained instruction to the target, after receiving the acknowledgment for the first instruction.

18. The system of claim 17, wherein:
the processing circuit of the target is further configured to:
  receive the order-constrained instruction, and
  send an acknowledgement for the order-constrained instruction; and
the processing circuit of the host is further configured to
  send the second instruction after receiving the acknowledgement for the order-constrained instruction.

19. The system of claim 17, wherein the host is connected to the target by a SCSI connection, and each of the instructions is a SCSI command or a SCSI task management function.

20. A system comprising a target,
the target comprising means for processing,
the means for processing being configured to:
  receive a first instruction;
  send an acknowledgment for the first instruction;
  execute the first instruction;
  receive a second instruction;
  send an acknowledgment for the second instruction; and
  execute the second instruction,
wherein
  the executing of the first instruction and
  the executing of the second instruction
are performed in the same order as
  the sending of the acknowledgment for the first instruction and
  the sending of the acknowledgment for the second instruction, and
wherein the executing of the first instruction and the second instruction comprises:
  entering the first instruction and the second instruction in an instruction ordering in an order in which the first instruction and the second instruction are received;
  sending the acknowledgements for the first and second instructions in response to the entering of the first and second instructions in the instruction ordering; and executing the first instruction and the second instruction in the same order as the instruction ordering.

\* \* \* \* \*